United States Patent
Shang (10) Patent No.: US 9,557,717 B2
(45) Date of Patent: Jan. 31, 2017

(54) DEVICES AND METHODS FOR AUTOMATIC ADJUSTMENT OF DISPLAY ELEMENTS

(71) Applicants: HISENSE USA CORP., Suwanee, GA (US); Hisense Electric Co., Ltd., Qingdao, Shandong (CN); Hisense International Co., Ltd., Qingdao, P.R.C. (CN)

(72) Inventor: Xiuyuan Shang, Qingdao (CN)

(73) Assignees: HISENSE USA CORP., Suwanee; Hisense Electric Co., Ltd., Qingdao (CN); Hisense International Co., Ltd., Qingdao (CN)

( * ) Notice: Subject to any disclaimer, the term of this patent is extended or adjusted under 35 U.S.C. 154(b) by 149 days.

(21) Appl. No.: 14/554,924

(22) Filed: Nov. 26, 2014

(65) Prior Publication Data
US 2016/0148348 A1    May 26, 2016

(51) Int. Cl.
| | |
|---|---|
| *G06T 3/60* | (2006.01) |
| *G06F 1/16* | (2006.01) |
| *G04G 21/02* | (2010.01) |
| *G04G 9/00* | (2006.01) |
| *G04C 3/00* | (2006.01) |

(52) U.S. Cl.
CPC ............ *G04G 21/02* (2013.01); *G04C 3/002* (2013.01); *G04G 9/00* (2013.01); *G06F 1/163* (2013.01); *G06F 2200/1614* (2013.01); *G09G 2340/0492* (2013.01)

(58) Field of Classification Search
None
See application file for complete search history.

(56) References Cited

U.S. PATENT DOCUMENTS

| | | | |
|---|---|---|---|
| 2003/0040380 A1* | 2/2003 | Wright | A63B 57/00 473/409 |
| 2005/0276164 A1* | 12/2005 | Amron | G04C 3/002 368/82 |
| 2015/0185836 A1* | 7/2015 | Slonneger | G06F 3/014 345/156 |

* cited by examiner

*Primary Examiner* — Yingchun He
(74) *Attorney, Agent, or Firm* — Troutman Sanders LLP (57) ABSTRACT

The present disclosure relates to arranging the orientation of a display on device based on motion of the device. In one embodiment, a method includes detecting movement of the device, and detecting motion data for the device. The motion data includes data associated with rotational movement of the device. The method includes analyzing, by a controller, the data associated with rotational movement of the device to determine an orientation for presenting a display of the device. The method may also include controlling the device to rotate the display to the determined orientation.

20 Claims, 6 Drawing Sheets

DEVICES AND METHODS FOR AUTOMATIC ADJUSTMENT OF DISPLAY ELEMENTS

FIELD

The present disclosure relates generally to devices and methods for adjusting the orientation of a device, and more particularly to automatic adjustment of display elements.

BACKGROUND

For many conventional watches, a user is allowed to wear the watch with only one orientation. Almost all watches are designed to be worn on the left hand with controls typically placed on the right side of the watch face. As such, the user must check to make sure the watch is in the right orientation as it may be undesirable to the wear the watch face upside down. Moreover, when wearing a watch on a right wrist, the crowns are facing away from a free hand while keeping the watch with the correct orientation. As a result, it may be difficult to operate the crowns by a user's free hand (e.g., left hand). Thus, there is a desire to provide devices with the ability to detect the correct orientation of the watch face. There is a need in the art for devices and methods that allow for changing the orientation of a device during use.

BRIEF SUMMARY OF THE EMBODIMENTS

Disclosed and claimed herein are devices and methods for arranging the orientation of a display on device based on motion of the device. In one embodiment, a method includes, detecting, by a device, movement of the device, and detecting, by the device, motion data for the device, wherein the motion data includes data associated with rotational movement of the device. The method also includes analyzing, by a controller, the data associated with rotational movement of the device to determine an orientation for presenting a display of the device, wherein analyzing includes determining angular velocity of the rotational movement, and controlling the device based on the analyzing to rotate the display to the determined orientation.

Another embodiment is directed to a device including at least one sensor configured to detect movement of the device and configured to detect motion data for the device, wherein the motion data includes data associated with rotational movement of the device. The device also includes a display and a controller coupled to the at least one sensor and display, the controller configured to receive an indication of movement of the device from the at least one sensor, initiate detection of motion data for the device by the at least one sensor, wherein the motion data includes data associated with rotational movement of the device, analyze the data associated with rotational movement of the device to determine an orientation for presenting a display of the device, wherein analyzing includes determining angular velocity of the rotational movement, and control the device based on the analyzing to rotate the display to the determined orientation.

Another embodiment is directed to a wearable device including a first sensor configured to detect movement of the wearable device. The wearable device includes a second sensor configured to detect motion data for the wearable device, wherein the motion data includes data associated with rotational movement of the wearable device. The device also includes a display and a controller coupled to the first sensor, second sensor and display, the controller configured to receive an indication of movement of the wearable device from the first sensor, initiate the second sensor to detect motion data for the wearable device, wherein the motion data includes data associated with rotational movement of the wearable device, to analyze the data associated with rotational movement of the wearable device to determine an orientation for presenting a display of the wearable device, and control the wearable device to rotate the display to the determined orientation.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is to provide devices and methods that automatically orient to a particular display orientation based on detected motion. Orientation of a device may also be detected based on angular rotation of a device. In one embodiment a device is provided to include at least one sensor. As will be discussed in more detail below, a device may be configured with a single sensor to arrange orientation of a display in certain embodiments. In other embodiments, the device may include a first sensor (e.g., accelerometer) and a second sensor (e.g., gyroscopic sensor). The device may be configured to allow for right hand or left hand use unlike configurations of some conventional designs do not lend themselves for use on another hand due to placement for watch controls.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
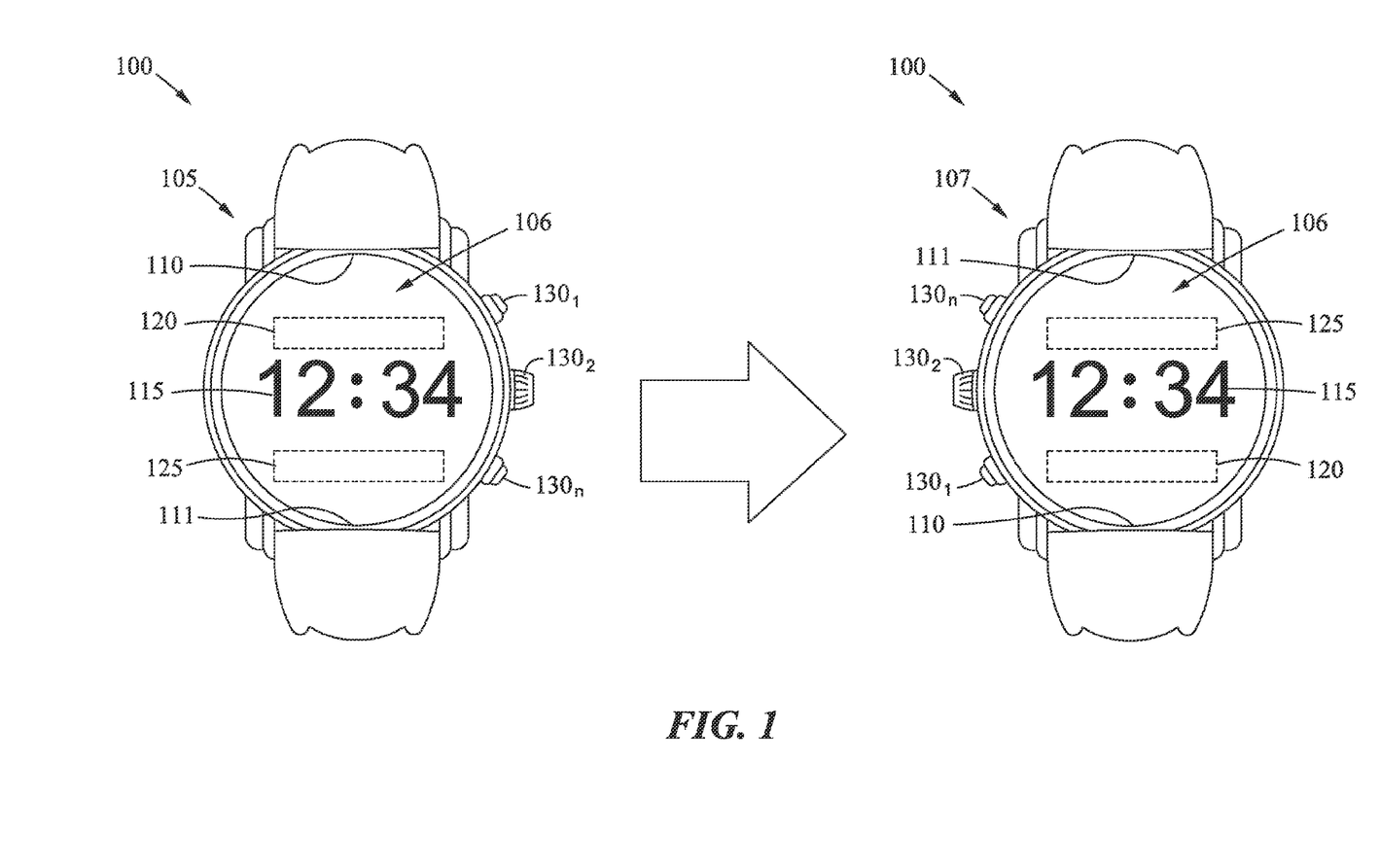
FIG. 1 depicts a graphical representation of arranging orientation of a display according to one or more embodiments.

Referring now to the figures, FIG. 1 depicts a graphical representation of arranging orientation of a display according to one or more embodiments. Device 100 is depicted in position 105 with display 106 presenting graphical elements 115. According to one embodiment, device 100 may be configured to adjust the orientation of display elements 115 based on motion detected for device 100 and/or rotation of device 100. FIG. 1 also depicts device 100 associated with orientation 107. According to one embodiment, and as will be described in more detail below, device 100 is configured to orient display elements 115 to be displayed relative to one or more positions of device 100. In that fashion, device 100 may present display elements 115 in an arrangement to accommodate multiple wearable arrangements.

Device 100 includes display 105 which may be configured to present display elements 115. Display 105 may be a digital display configured to display elements 115 with one or more orentations. Display elements 115 are shown as a time display represented by digits, however, it should be appreciated that display elements may refer to one or more other types of display. Display elements 115 may be a clock display including hands or other representations of time.

According to certain embodiments, display 106 may include one or more display areas, shown as display areas 120 and 125, which may be used to display other data. In embodiments where display 106 is a touch display, areas 120 and 125 may relate to areas for receiving one or more input commands (e.g., tap, swipe, slide, expand, etc.)

According to one embodiment, device 100 may be a watch or timepiece, such as a wrist watch. According to another embodiment, device 100 may relate to other devices, including but not limited to wearable devices. Device 100 may be device mounted to a structure or article that changes position. As will be discussed in more detail below with respect to FIGS. 6A-6B and 7A-7B, the principles of device 100 may be applied to other devices.

According to one embodiment, device 100 may include one or more inputs $130_{1-n}$ which may be buttons or controls for device 100. By way of example, when device 100 is a watch, inputs $130_{1-n}$ may include a crown and one or more push buttons. In certain embodiments, inputs $130_{1-n}$ may be optional. According to another embodiment, the orientation of display elements 115 may be associated with the position of inputs $130_{1-n}$ determined. For example, position 105 may relate to a position for wearing a watch on a left hand. Inputs $130_{1-n}$ are on the right side of device 100 in position 105.

According to one embodiment, device 100 may be configured to adjust orientation of display 106 based on movement. According to another embodiment, device 100 may adjust the orientation of display 115 relative to one or more reference points determined for the device. In position 105, portion 110 of device 100 relates to the top of position of device 100, and position 111 relates to a bottom position of device 100. As will be described below, a device as described herein may include one or more sensors (not shown in FIG. 1). By the device 100 detecting movement, one or more points of the device 100 may be determined as the top and bottom with respect to the current orientation. As such, display elements 115 may be aligned with the current portion of device 100 that is the top.

FIG. 1 also displays device 100 in position 107. Position 107 may relate to a position for wearing device 100 on the right hand. As shown in position 107, device 100 orients display 106 to provide display element 115 relative to position 111 as the top and position 110 as the bottom of the display 106. Inputs $130_{1-n}$ are on the left side of device 100 in position 107. In that fashion, a user of deice 100 that wears the device 100 on a right hand may operate inputs $130_{1-n}$ with their left hand.

In certain embodiments, device 100 may be configured to detect movements that indicate whether device 100 is being worn on a left hand, such as position 106, or a right hand, such as position 107. In addition, device 100 may orient display elements 115 based on a detected position. In certain embodiments, device 100 may be configured to allow for either of positions 105 and 107 to employ either right hand or left hand operation. In that fashion, inputs $130_{1-n}$ may be positioned based on a user preference. Provided herein are devices and methods for orienting a device to present display elements, such as display elements 115. As will be discussed below, one or more processes are provided for detecting movement and adjusting display, such as display 106. Although FIG. 1 is discussed with reference to a time piece and display elements 115 for time, it should be appreciated that the principles for can be applied presentation by other devices and/or for other display elements.

Figure 2:
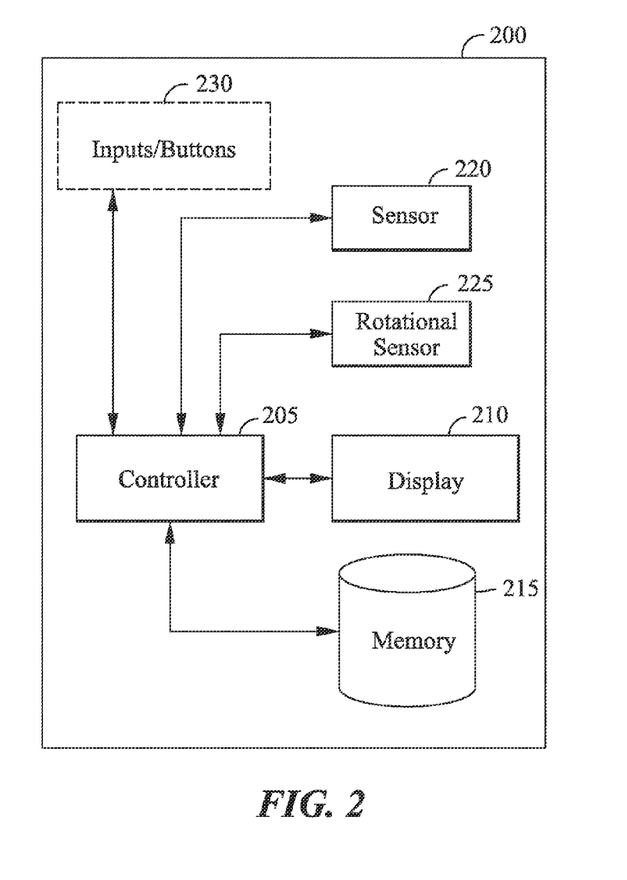
FIG. 2 depicts a simplified block diagram of a device according to one or more embodiments.

FIG. 2 depicts a simplified block diagram of a device according to one or more embodiments. Device 200 may relate to the device of FIG. 1 according to one or more embodiments. Device 200 includes controller 205, display 210, memory 215, sensor 220 and rotational sensor 225. In certain embodiments, device 200 includes inputs/buttons 230. Device 200 may be configured to detect motion and orient elements for display 210.

Controller 205 may be configured to execute code stored in memory 215 for operation of device 200 including presentation display elements on display 210. Controller 205 may include a processor and/or one or more processing elements. In one embodiment controller 205 may be include one or more of hardware, software, firmware and/or processing components in general. According to one embodiment, controller 205 may be configured to perform one or more processes described herein, such as the process of FIG. 3. Memory 215 may include non-transitory RAM and/or ROM memory for storing executable instructions, operating instructions and content for display 210.

Sensor 220 is configured to detect movement of device 200. Sensor 220 may be a movement sensor configured to detect movements along one or more axes. In certain embodiments sensor 220 consumes less power than rotational sensor 225. As such sensor 220 is configured to trigger a motion recognition process. According to some embodiments, any movement of device 200 will be detected by sensor 220 to activate motion recognition process. Sensor 220 may be an accelerometer, and wherein movement detected by the accelerometer initiates detection of the motion data for device 200.

Rotational sensor 225 is configured to detect motion data for device 200, wherein the motion data includes data associated with rotational movement of the device 200. Rotational sensor 225 may by a gyroscopic sensor configured to provide real-time data for monitoring the motion of device 200. Rotational sensor 225 may be configured to be sampled from 10 Hz~50 Hz. Rotational sensor 225 may be a gyroscopic sensor configured to generate motion data for device 200. Rotational sensor 225 may be configured to determine rotation relative to a horizontal axis.

In certain embodiments, sensor 220 may be optional. By way of example, device 200 may include a single sensor, such as rotational sensor 225, configured to detect movement of a device 200 and for determining motion data for device 200. Device 200 and rotational sensor 225 may be configured to detect movement and characterize motion of the device in certain embodiments. In that fashion, a single sensor of device 200 initiates detection of the motion data for device 220 in certain embodiments.

Controller 205 is coupled to display 210, memory 215, sensor 220 and rotational sensor 225. Controller 205 is configured to receive an indication of movement of the device 200 from sensor 220. Controller 205 may then initiate rotational sensor 225 to detect motion data for the device 200, the motion data including data associated with rotational movement of device 200. Controller 205 is also configured to analyze the data associated with rotational movement of the device 200 to determine an orientation for presenting a display of the device, and controlling the device 200 to rotate the display to the determined orientation.

Figure 3:
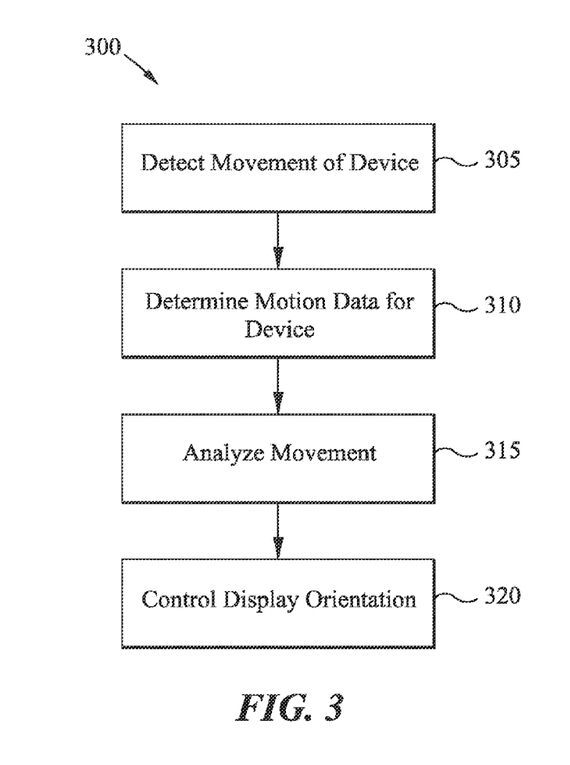
FIG. 3 depicts a process for arranging orientation of a display according to one or more embodiments.

FIG. 3 depicts a process for arranging orientation of a display according to one or more embodiments. Process 300 may be employed for arranging the orientation of a display (e.g., display 106) on a device (e.g., device 100) based on motion of the device. Process 300 may be performed by one or more types of devices, such as the devices of FIGS. 1, 2, 6A-6B and 7A-7B.

Process 300 may be initiated at block 305 with detecting movement of a device. A device can detect movement at block 305 of the device based on a sensor (e.g., sensor 220, rotational sensor 225, etc.) of the device, which consumes less power than a gyroscope sensor. For example, the sensor configured to detect movement at block 305 may be an accelerometer, and the movement of the device detected by the accelerometer can initiate detection of the motion data for the device. Thus, a device may be configured to automatically check orientation of a device.

At block 310, motion data for the device may be determined by the at least one sensor of the device. In certain embodiments, the device employs a rotational sensor (e.g., rotational sensor 225) in addition to a movement sensor (e.g. sensor 220). The motion data at block 310 can include data associated with rotational movement of the device and may be generated by a gyroscopic sensor. The motion data may relate to rotation relative to a horizontal axis and/or tilting of the device along a transverse axis of the device.

In certain embodiments, detecting movement of a device at block 305 and determining motion data for the device at block 310 may be determined by a single sensor (e.g., rotational sensor 225). In that fashion, a single sensor of the device initiates detection of the motion data for the device and detects movement.

At block 315, a controller (e.g., controller 205) analyzes the data associated with rotational movement of the device 200 to determine an orientation for presenting a display of the device 200. Analyzing at block 315 can include determining the angular velocity of the rotational movement of the device. Analyzing at block 315 may also include determining peak velocity and direction of peak velocity to determine the orientation for presenting display.

At block 320, a controller (e.g., controller 205) controls the device (e.g., device 200) to rotate the display to the determined orientation. In one embodiment, the display of the device includes a time display. Controlling can include arranging a time display relative to one or more features of the device, such as features of a smart device or smart wrist watch. In another embodiment, a determined orientation is associated with control elements of a time piece. The determined orientation may be based on a predetermined movement associated with wearing the device. Controlling the device at block 320 may relate to controlling presentation of a display for a wearable device.

Figure 4A:
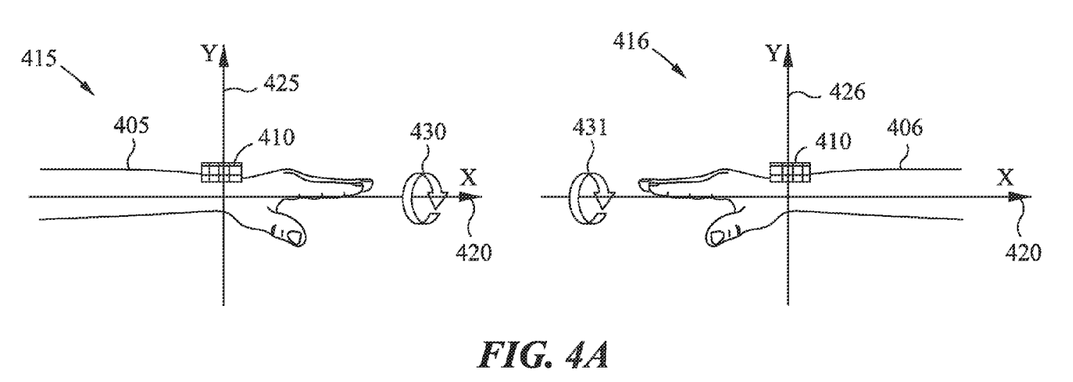
FIGS. 4A-4B depict graphical representations of device rotation according to one or more embodiments.
Figure 4B:
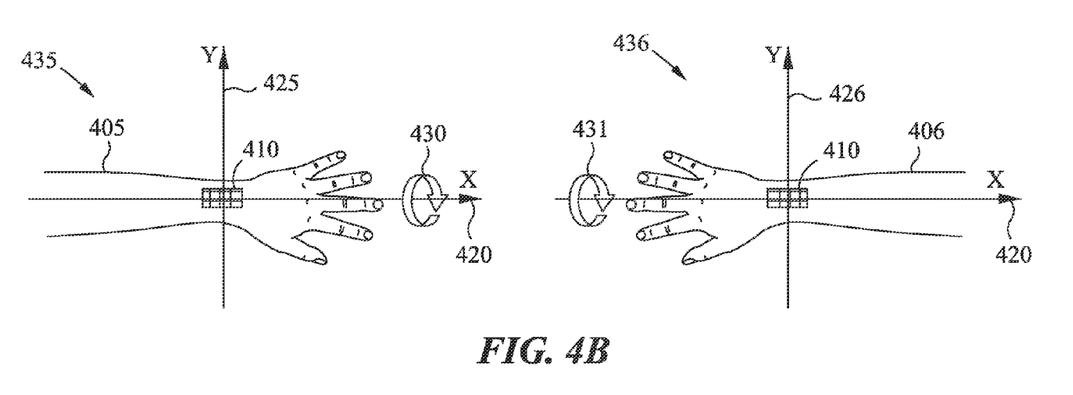

FIGS. 4A-4B depict graphical representations of device rotation according to one or more embodiments. FIG. 4 depicts a left arm 405, and a right arm 406, each arm wearing a device 410. Device 410 may relate to devices described herein configured to orient position of display elements. According to another embodiment, a device may be configured to detect movement and determine motion data for a device. FIG. 4A depicts an exemplary representation of rotation. Arm 405 is shown with position 415, relative to x-axis 420 and y-axis 425 such that device 410 is on top of a wrist portion of arm 405. Arm 406 is shown with position 416; relative to x-axis 420 and y-axis 426 such that device 410 is on top of a wrist portion of arm 406. According to one embodiment, rotation detected by a device, such as device 410, may be relative to an axis, such as x-axis 420. According to another embodiment, rotation detected by a device, such as device 410, may be relative to or associated with tilting of the device relative x-axis 420, which may be transverse axis device 410. Tilting along a transverse axis of a device may be associated with viewing of the device and motion indicative of wearing device 410 on either a right or left wrist. FIG. 4A depicts exemplary rotation of arm 405 as 430 and rotation of arm 406 as 431.

FIG. 4B depicts an exemplary representation after rotation. Arm 405 is shown with position 435, relative to x-axis 420 and y-axis 425 such that device 410 is on top of a wrist portion of arm 405, the arm 405 rotated as shown by 430. Arm 406 is shown with position 436; relative to x-axis 420 and y-axis 426 such that device 410 is on top of a wrist portion of arm 406.

According to one embodiment, rotation (e.g., rotational movement) detected by a device, such as device 410, may be relative to an axis, such as x-axis 420. FIG. 4A depicts exemplary rotation of arm 405 as 430 and rotation of arm 406 as 431, such that the rotation in directions 430 and 431 may be detected may be with respect to an x-axis, such as x-axis 420. Alternatively or in combination, rotation directions 430 and 431 detected by device 410 may relate to rotation employed by a user to view the device. By way of example, device 410 may be configured to sense a predetermined or typical movement that is associated with twisting of a wrist to view a wrist watch according to some embodiments. FIGS. 4A-4B depict exemplary movement that may be detected to ascertain display position.

Figure 5A:
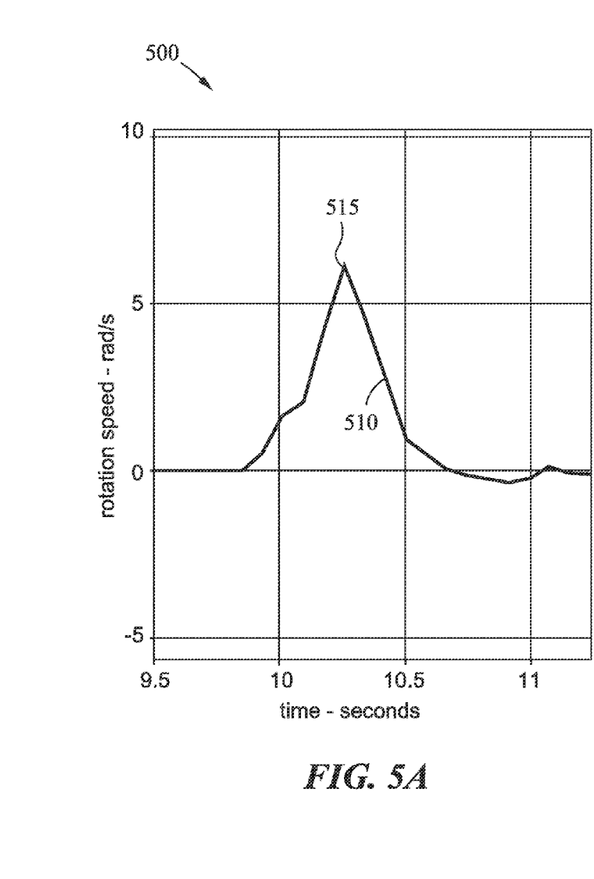
FIGS. 5A-5B depict graphical representations of movement data according to one or more embodiments.
Figure 5B:
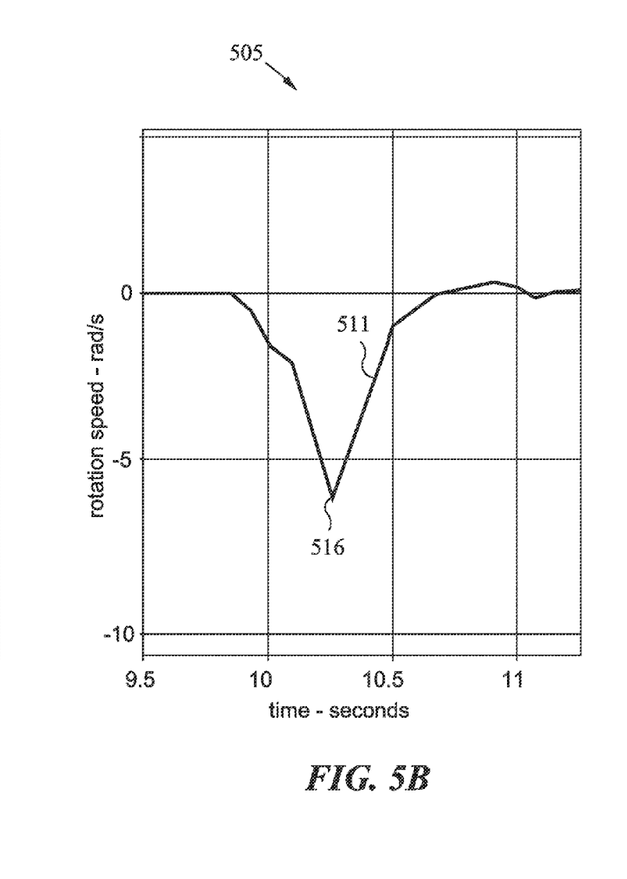

FIGS. 5A-5B depict graphical representations of movement data according to one or more embodiments. According to one embodiment, devices and processes herein may employ angular velocity determined from detected motion data. FIGS. 5A-5B depicts exemplary representations of angular velocity with respect to rotation about an axis (e.g., x-axis 420). FIG. 5A depicts rotation of a device on a left wrist (e.g., device 410 on arm 405). FIG. 5B depicts rotation of a device on a right wrist (e.g., device 410 on arm 406). Angular velocity is plotted as 510 in FIG. 5A, with a peak shown as 515, and is plotted as 511 in FIG. 5B with a valley (e.g., downward peak) shown as 516. According to one embodiment, the orientation of a device may be determined based on the direction of peak velocity. By way of example, a peak velocity pointing up, such as peak velocity 515 may indicate left arm operation, while a peak velocity pointing down, such as peak velocity 516, may indicate right arm position. Accordingly, a device, and processes for operating the device may detect and characterize peak velocity and peak velocity direction to determine orientation of display elements. According to another embodiment, rotation of a device represented in FIGS. 5A-5B may be relative to and/or associated with tilting of a device (e.g., device 410) relative to a transverse axis of the device. Rotation of a device represented in FIGS. 5A-5B may be an exemplary representation of motion associated with viewing a device and motion indicative of wearing a device on either a right or left wrist (e.g., arm).

Either of plots 510 and 511 may begin based on detected movement such as a user starting to raise his/her arm to look at the watch. Any movement of the device will activate the motion recognition process for five seconds. The recognition process may be started to monitor motion data generated from the rotational (e.g., gyroscope) sensor in real time. Data from gyroscope sensor (e.g., rotational sensor 225) should be sampled at the rate of 10 Hz~50 Hz to extract the angular velocity from the motion data. In certain embodiments, only the angular velocity on the x-axis is retained. Orientation may then be determined by the angular velocities which should stay either positive or negative for a period >0.5 s and <1.0 s. The peak velocity during the period above should be greater than 5 rad/s or −5 rad/s.

Figure 6A:
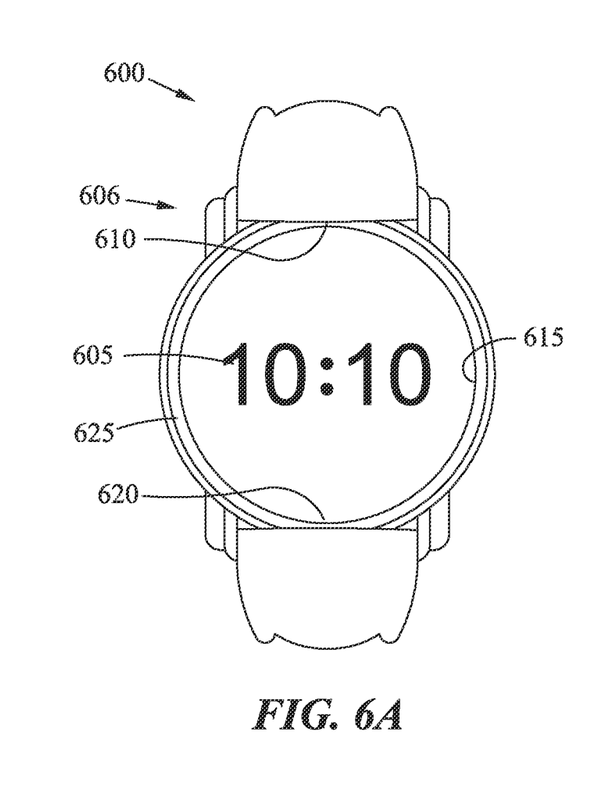
FIGS. 6A-6B depict graphical representations of arranging orientation of a display according to one or more other embodiments.
Figure 6B:
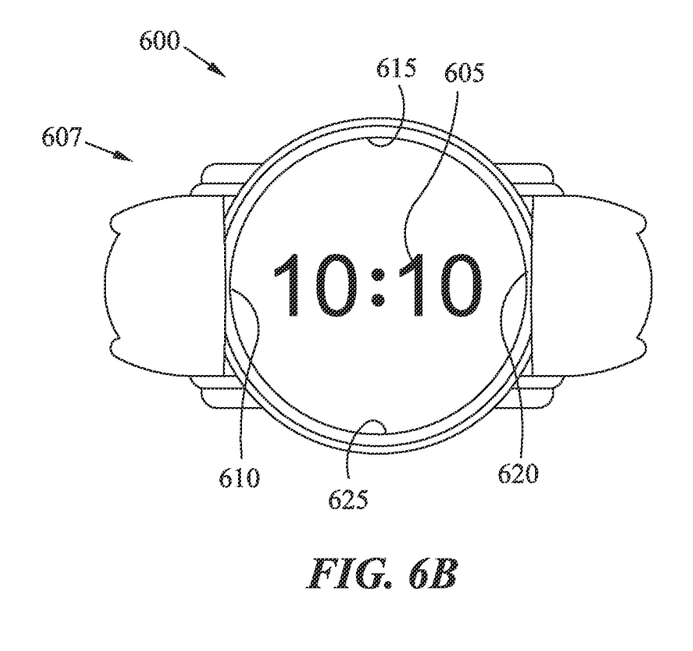

FIGS. 6A-6B depict graphical representations of arranging orientation of a display according to one or more other embodiments. According to another embodiment, rotation of display elements may not require input controls. By way of example, FIG. 6A depicts device 600 with display elements 605. Device 600 is in position 606 in FIG. 6A with display elements orientated such that device portion 610 is the top, portion 615 is the right side, portion 620 is the bottom and portion 615 is the left side. According to one embodiment, device 600 may adjust the presentation of display elements 605 based on the movement and the rotation of display device 600 in FIG. 6B.

Figure 7A:
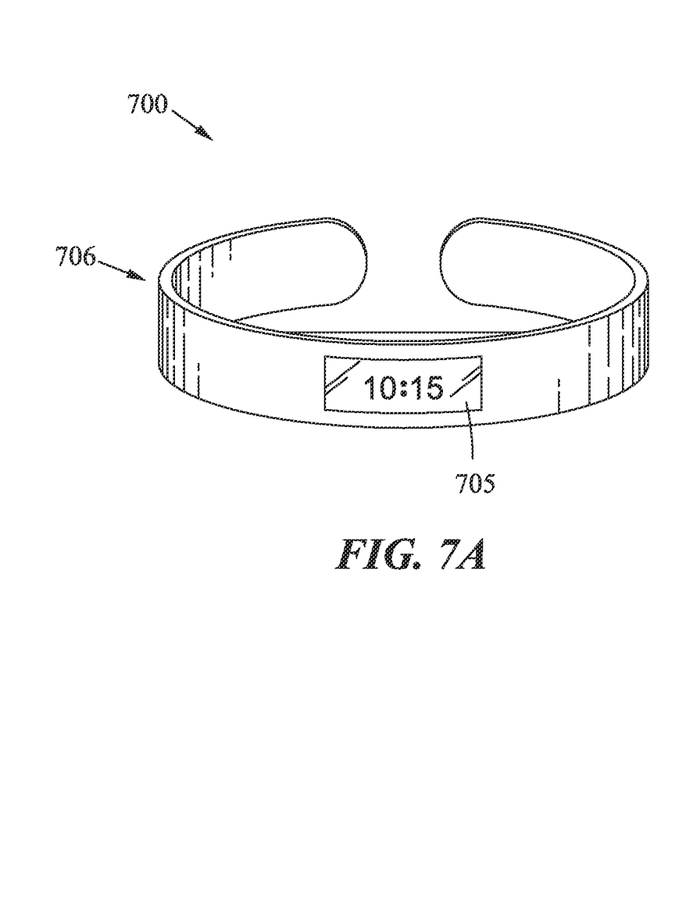
FIGS. 7A-7B depict graphical representations of arranging orientation of a display according to one or more other embodiments.
Figure 7B:
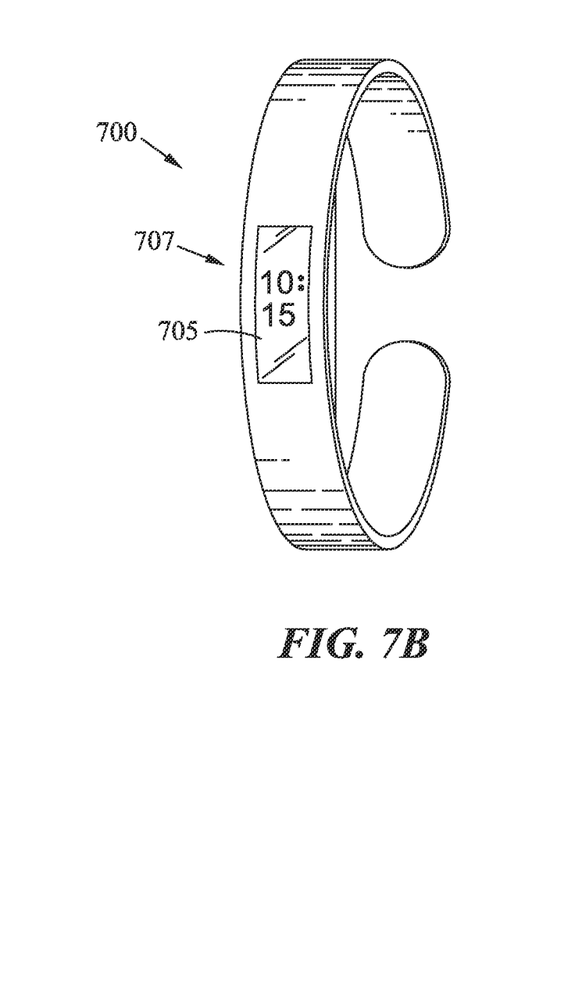

FIGS. 7A-7B depict graphical representations of arranging orientation of a display according to one or more other embodiments. According to certain embodiment, arranging a display could be for other types of devices. Device 700 in FIGS. 7A-7B relates to a feedback device (e.g., biofeedback, activity meter, etc.). Device 700 includes display 705. In FIG. 7A, device 700 is in position 706 such that display 705 presents a time value with a first orientation (e.g., horizontal orientation). In FIG. 7B, device 700 is in position 707 such that display 705 presents a time value with a modified (e.g., horizontal) orientation. In addition to adjusting the orientation, device 700 converts the display format. Thus, according to another embodiment, a device may be configured to change orientation and format of the display elements based on movement and/or orientation detected for a device.

While this disclosure has been particularly shown and described with references to exemplary embodiments thereof, it will be understood by those skilled in the art that various changes in form and details may be made therein without departing from the scope of the claimed embodiments.

What is claimed is:

1. A method for arranging the orientation of a display on device based on motion of the device, the method comprising:
    detecting, by a device, movement of the device;
    detecting, by the device, motion data for the device, wherein the motion data includes data associated with rotational movement of the device;
    analyzing, by a controller, the data associated with rotational movement of the device to determine an orientation for presenting a display of the device, wherein analyzing includes determining angular velocity of the rotational movement, wherein analyzing further includes determining peak velocity and direction of peak velocity to determine the orientation for presenting the display; and
    controlling the device based on the analyzing to rotate the display to the determined orientation.

2. The method of claim 1, wherein the movement of the device is detected by an accelerometer, and wherein movement detected by the accelerometer initiates detection of the motion data for the device.

3. The method of claim 1, wherein the motion data is detected by a gyroscopic sensor.

4. The method of claim 1, wherein the motion data relates to rotation associated with tilting the device along a transverse axis of the device.

5. The method of claim 1, wherein controlling includes changing format of the display elements based on at least one of movement and orientation detected for the device.

6. The method of claim 1, wherein the display of the device includes a time display.

7. The method of claim 1, wherein controlling includes arranging a time display relative to one or more features of the device.

8. The method of claim 1, wherein the determined orientation is associated with control elements of a time piece.

9. The method of claim 1, wherein the determined orientation is based on a predetermined movement associated with wearing the device.

10. The method of claim 1, wherein controlling the device relates to controlling presentation of a display for a wearable device.

11. A device comprising:
    at least one sensor configured to detect movement of the device and configured to detect motion data for the device, wherein the motion data includes data associated with rotational movement of the device;
    a display; and
    a controller coupled to the at least one sensor, and display, the controller configured to receive an indication of movement of the device from the at least one sensor, initiate detection of motion data for the device by the at least one sensor, wherein the motion data includes data associated with rotational movement of the device, analyze the data associated with rotational movement of the device to determine an orientation for presenting a display of the device, wherein analyzing includes determining angular velocity of the rotational movement, wherein analyzing further includes determining peak velocity and direction of peak velocity to determine the orientation for presenting the display, and control the device based on the analyzing to rotate the display to the determined orientation.

12. The device of claim 11, wherein the movement of the device is detected by an accelerometer, and wherein movement detected by the accelerometer initiates detection of the motion data for the device.

13. The device of claim 11, wherein the motion data is detected by a gyroscopic sensor.

14. The device of claim 11, wherein the motion data relates to rotation associated with tilting the device along a transverse axis of the device.

15. The device of claim 11, wherein control includes changing format of the display elements based on at least one of movement and orientation detected for the device.

16. The device of claim 11, wherein the display of the device includes a time display.

17. The device of claim 11, wherein controlling includes arranging a time display relative to one or more features of the device.

18. The device of claim 11, wherein the determined orientation is associated with control elements of a time piece.

19. The device of claim 11, wherein the determined orientation is based on a predetermined movement associated with wearing the device.

20. A wearable device comprising:

a first sensor configured to detect movement of the wearable device;

a second sensor of the device configured to detect motion data for the wearable device, wherein the motion data includes data associated with rotational movement of the wearable device;

a display; and a controller coupled to the first sensor, second sensor and display, the controller configured to receive an indication of movement of the wearable device from the first sensor, initiate the second sensor to detect motion data for the wearable device, wherein the motion data includes data associated with rotational movement of the wearable device, analyze the data associated with rotational movement of the wearable device to determine an orientation for presenting a display of the wearable device, wherein analyzing further includes determining peak velocity and direction of peak velocity to determine the orientation for presenting the display, and control the wearable device to rotate the display to the determined orientation.

\* \* \* \* \*